(12) United States Patent
Plawecki et al.

(10) Patent No.: US 11,922,331 B2
(45) Date of Patent: Mar. 5, 2024

(54) MACHINE-LEARNING-BASED PREDICTIVE ICE DETECTION

(71) Applicants: Nathan D. Plawecki, Melbourne, FL (US); Daniel W. Plawecki, Melbourne, FL (US)

(72) Inventors: Nathan D. Plawecki, Melbourne, FL (US); Daniel W. Plawecki, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 862 days.

(21) Appl. No.: 17/003,012

(22) Filed: Aug. 26, 2020

(65) Prior Publication Data

US 2022/0067542 A1 Mar. 3, 2022

(51) Int. Cl.
*B64D 15/20* (2006.01)
*G06N 5/04* (2023.01)
(Continued)

(52) U.S. Cl.
CPC .............. *G06N 5/04* (2013.01); *B64D 15/20* (2013.01); *G06N 20/00* (2019.01); *G05D 1/1062* (2019.05)

(58) Field of Classification Search
CPC .......... G06N 5/04; G06N 20/00; B64D 15/20; G05D 1/1062; Y02A 90/10
See application file for complete search history.

(56) References Cited

U.S. PATENT DOCUMENTS 8,620,836 B2  12/2013 Ghani et al.
8,642,538 B2  2/2014  Ku et al.
(Continued)

FOREIGN PATENT DOCUMENTS

WO   2020/053785   3/2020

OTHER PUBLICATIONS

Gensim_Models: "models.doc2vac-Doc2vec paragraph embeddings"; found on the internet Jan. 23, 2020 at: https://radimrehurek.com/gensim/models/doc2vec.html; pp. 1-13.
(Continued)

*Primary Examiner* — Ryan W Sherwin
(74) *Attorney, Agent, or Firm* — Tarolli, Sundheim, Covell & Tummino LLP (57) ABSTRACT

Systems and methods for machine-learning-based aircraft icing prediction use supervised and unsupervised learning to process real-time environmental data, such as onboard measurements of outside air temperature and dew point, to predict a risk of icing and determine whether to issue an icing risk alert to an onboard crewmember or a remote operator, and/or to recommend an icing avoidance maneuver. The systems and methods can use reinforcement learning to generate a confidence metric in the predicted risk of icing, to determine a time or distance to predicting icing, and/or to not issue an alert or recommend a maneuver in consideration of historical data in a "library of learning" and/or other flight data such as airspeed, altitude, time of year, and weather conditions. The predictive systems and methods are low-cost and low-power, do not require onboard weather radar, and can be effective for use in smaller aircraft that are completely icing-intolerant.

17 Claims, 4 Drawing Sheets

(51) Int. Cl.
*G06N 20/00* (2019.01)
*G05D 1/00* (2006.01)

(56) References Cited

U.S. PATENT DOCUMENTS

| | | | |
|---|---|---|---|
| 9,317,564 | B1 | 4/2016 | Korolev et al. |
| 9,940,323 | B2 | 4/2018 | Boyer et al. |
| 10,160,550 | B1 | 12/2018 | Somanath et al. |
| 10,179,652 | B2 | 1/2019 | Skjoedt |
| 10,214,294 | B1 | 2/2019 | Gauthier et al. |
| 2005/0251341 | A1* | 11/2005 | Nielsen .................. G01W 1/10 702/3 |
| 2007/0267546 | A1* | 11/2007 | Shah ...................... B64D 15/20 340/580 |
| 2016/0274271 | A1* | 9/2016 | Lukas ..................... G01W 1/02 |
| 2017/0293687 | A1 | 10/2017 | Kolotienko et al. |
| 2018/0252842 | A1* | 9/2018 | Arandia ................. G06N 5/022 |
| 2019/0179896 | A1 | 6/2019 | Anisimovich et al. |
| 2019/0185185 | A1* | 6/2019 | Vercillo ................ B64D 45/00 |
| 2019/0225346 | A1* | 7/2019 | Calmels ................ G06N 20/00 |
| 2022/0028287 | A1* | 1/2022 | Durant .................. G06N 20/00 |

OTHER PUBLICATIONS

Le et al.: "Distributed Representations of Sentences and Documents"; found on the internet Jan. 23, 2020 at: https://cs.stanford.edu/~quocle/paragraph_vector.pdf; pp. 1-9.

Malkani et al.: "Supervised Multi-Class Classification of Tweets"; Dec. 14, 2012; found on the internet Jan. 23, 2020 at: http://cs229.stanford.edu/proj2012/GillieMalkani-SupervisedMulticlassClassificationOfTweets.pdf; pp. 1-6.

Matplotlib: "Matplotlib"; found on the internet Jan. 23, 2020 at https://matplotlib.org/; pp. 1-3.

NumPy.org: "NumPy"; found on the internet Jan. 23, 2020 at https://numpy.org; pp. 1-3.

Pandas: "Python Data Analysis Library"; found on the internet Jan. 23, 2020 at https://pandas.pydata.org; pp. 1-3.

Salgado: "Multiclass Text Classification From Start To Finish"; Mar. 31, 2019; found Jan. 23, 2020 at https://medium.com/@robert.salgado/multiclass-text-classification-from-start-to-finish-f616a8642538; pp. 1-17.

Scikit-Learn: "Machine Learning in Python"; found on the internet Jan. 23, 2020 at https://scikit-learn.org/stable; p. 1-2.

Seaborn: "seaborn: statistical data visualization"; found on the internet Jan. 23, 2020 at https://seaborn.pydata.org; pp. 1-2.

International Search Report for corresponding PCT/US2021/043826 dated Feb. 4, 2022.

Strapp, et al.: "DOT/FAA/TC-14/31 The High Ice Water Content Study of Deep Convective Clouds: Report on Science and Technical Plan", Jun. 30, 2016 (Jun. 30, 2016), pp. 1-105, XP055880858, Retrieved from the Internet: URL:https://www.tc.faa.gov/its/worldpac/techrpt/tc14-31.pdf [retrieved on Jan. 19, 2022] p. 44-p. 46; tables 2, 3.

* cited by examiner

MACHINE-LEARNING-BASED PREDICTIVE ICE DETECTION

TECHNICAL FIELD

The present invention relates generally to the field of detection of the build-up of ice on exterior surfaces of aircraft, and specifically to methods and systems for machine-learning-based predictive ice detection.

BACKGROUND

Certain weather conditions pose hazards for navigating aircraft. Severe turbulence, thunderstorms, and others can be relatively readily detected with the aid of modern instrumentation and sensors and avoided by a pilot or automated navigation system. The buildup of ice on airfoils and rotor blades, however, persists as an aerodynamic-profile-modifying challenge. Ice buildup on aircraft can increase drag by increasing the area of the airfoil profile, can decrease the ability to generate lift by altering the airfoil camber, can add potentially significant weight, and can often engender vibration of the aircraft owing to imbalance based on ice accumulation on the structure being asymmetrical. Inflight-operative anti-icing systems to preclude ice accumulation can often require prohibitive amounts of power. Deicing systems to remove already-accumulated ice can prove inadequate or have unacceptable drawbacks.

Rotor icing poses a significant flight safety hazard to helicopters that do not have rotor deicing systems. In crewed helicopters, pilots are therefore careful to avoid or quickly exit icing conditions. Helicopter UAVs (unmanned aerial vehicles) are as prone to icing as manned helicopters, but do not have the human pilot's eyes or experience to avoid or quickly detect icing. Commercially available fixed-wing-type ice detectors are slow to sense icing on a helicopter where ice can accrete much faster on rotor blades than on other parts of the airframe. Even small accumulations of rotor ice can quickly lead to loss of control and/or loss of aircraft.

Machine learning (ML) is a subset of artificial intelligence (AI) in which a computer uses algorithms and statistical models to accurately perform tasks without using explicitly coded instructions after having after having analyzed a learning or training data set, in effect relying on patterns and inferences to generalize from past experience. Accordingly, ML-based systems can be capable of solving problems not previously seen or considered and for which it would not be possible to code for every individual case. Types of ML algorithms include, among others, supervised learning, unsupervised learning, and feature learning. Types of ML models that can be trained on the training data include artificial neural networks, decision trees, support vector machines, regression analysis models, Bayesian networks, genetic algorithms, principal components analysis, and cluster analysis.

SUMMARY

One example includes a system for aircraft icing prediction that includes an aircraft-mounted environmental sensor suite configured to measure at least two different kinds of environmental parameters corresponding to conditions external to the aircraft as the aircraft travels along a flight path. The system further includes data acquisition circuitry communicatively coupled to the environmental sensor suite and configured to acquire and deliver real-time environmental data from the environmental sensor suite. The system further includes an onboard computer system, communicatively coupled to the data acquisition circuitry to receive the environmental data. The computer system includes a supervised learning engine and a reinforcement learning engine configured to process the environmental data and user-defined parameters with to compute a probability that the aircraft will experience icing along the flight path, and to generate an icing risk alert and/or a recommended icing avoidance maneuver based on the computed probability of icing.

Another example includes a method, executed on an aircraft icing prediction computer system, of predicting icing of the aircraft. A regression analysis of real-time environmental data collected during a flight of the aircraft is performed using a supervised learning algorithm to predict a risk of icing. Then, at least one of the following is done, based on determining that the predicted risk of icing does not meet an acceptable level of safety based on user-defined parameters. An icing risk alert is generated to an onboard crewmember or a remote operator, and/or an icing avoidance maneuver is recommended. Alternatively, if the predicted risk of icing does meet the acceptable level of safety, no icing risk alert is issued, no icing avoidance maneuver is recommended, and the environmental data and the predicted risk of icing is added to a library of learning stored in a database.

Yet another example includes an aircraft with an airframe to which are mounted an outside air temperature sensor and a dew point sensor to collect measurements of outside air temperature and dew point. The aircraft also includes computing circuitry configured to perform supervised learning comprising regression analysis of the collected outside air temperature and dew point measurements to determine a risk of icing of the aircraft.

DETAILED DESCRIPTION

Probable accretion of ice on an airframe, rotors, or engine inlets of an aircraft can be detected, for example, by sensor probes configured to detect present environmental icing conditions, based on which an alert can be generated to a pilot or other crewmember who can factor the alert into aircraft navigation decision-making. Continuing to fly in such environmental icing conditions may result in the build-up of significant ice load that could either impact aerodynamic performance of the aircraft or put an unacceptable amount of weight on the aircraft. The consequent additional drag and/or vibration, and/or reduced engine power, engine cooling, and/or lift could lead to an unacceptable level of fuel consumption or engine overheating, hindering accomplishment of mission objectives, or lead to loss of control and/or catastrophic loss of aircraft. However, the usefulness of the detection of present environmental icing conditions is based on the premise that the airframe can tolerate some level of icing. Uncrewed aircraft, which may be smaller, lighter, and/or rotor-based, including, for example, quadcopters or small helicopters such as the Northrop Grumman MQ-8 Fire Scout, may not be equipped with systems for icing remediation and may be virtually totally intolerant of ice accretion, such that detection of present environmental icing conditions may only provide information that comes too late to save the aircraft or its mission objectives. Turbine engines are also vulnerable to foreign object damage (FOD) from ice. Accordingly, the systems and methods described herein provide predictive detection of icing conditions in advance of flight into such conditions, enabling preemptive navigation action and maneuvering out of the potential icing conditions, making it possible to fly without ice ever being accumulated on the aircraft.

Although advance detection of icing conditions may in some cases be aided with the use of a weather radar, a full weather radar system can require too much power and can weigh too much for a smaller aircraft to be equipped with such a radar system. The amount of time of advance warning of icing conditions can also be a critical factor in, for example, avoidance of obstacles or terrain or providing time to negotiate with air traffic control to de-conflict ice avoidance maneuvers with other aircraft traffic. The need to making navigation decisions and plan, negotiate, and execute maneuvers within a limited timeframe can place stress on an operating environment that can impact human pilots or remote operators and autonomous systems alike. Accordingly, the systems and methods described herein can advantageously provide icing prediction without the use of weather radar, at low cost, with minimal power consumption, and minimal weight, while still detecting icing conditions as far in advance of hazardous conditions as possible, thereby reducing the stress of the operating environment.

Figure 1:
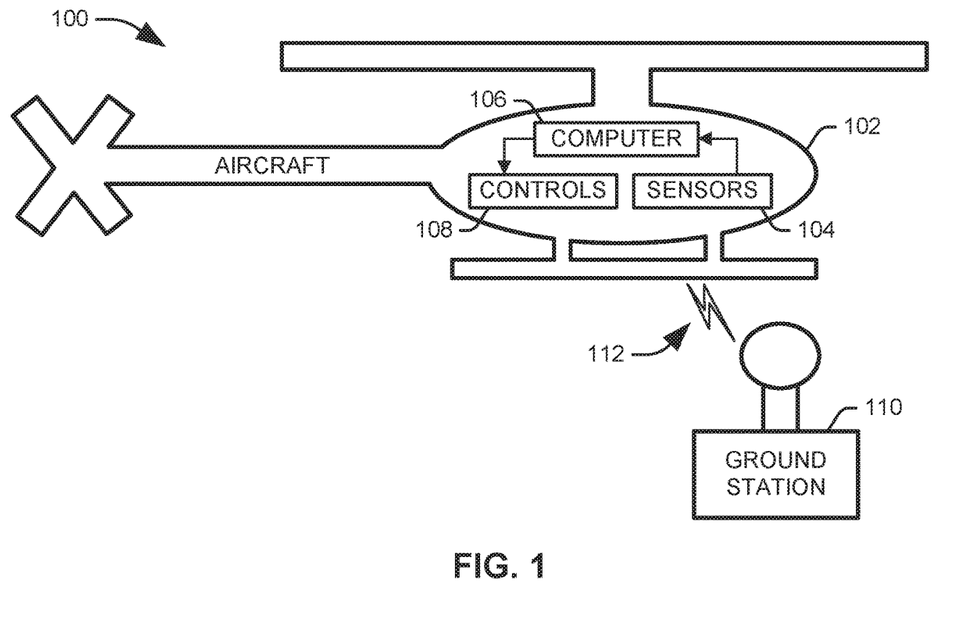
FIG. 1 is a schematic diagram of an example aircraft icing prediction system.

FIG. 1 illustrates an example aircraft system 100 implemented with a machine-learning-based icing predicting system. The system 100 includes an aircraft 102, which is illustrated as a helicopter with a single main rotor, but can, in various examples, be a propeller plane, a jet plane, a quadcopter, or another form of aircraft or multi-mode-mobility vehicle. In some examples, aircraft 102 can be crewed with at least one human pilot or navigator aboard, or in other examples can be remotely piloted or semi- or fully autonomous.

The aircraft 102 includes one or more environmental sensors 104 configured to measure ambient conditions external to the aircraft. The aircraft further includes a computer system 106 communicatively coupled to the sensors 104 and configured to process environmental data from the sensors with an icing prediction decision engine. Data acquisition circuitry (not shown) can provide an appropriate interface between the sensors 104 and the computer system 106, and as such, can be considered to be part of either or both of the environmental sensors 104 or the computer system 106, to provide environmental data based on the measurements of the environmental sensors 104 to computer system 106. Environmental sensors 104 can include, for example, one or more temperature sensors and one or more dew point sensors. In some examples, environmental sensors 104 do not include a weather radar, and aircraft 102 is not otherwise provided with an onboard weather radar. Examples of suitable dew point sensors include Michell Instruments Easidew transmitters and samplers and the Edgetech Instruments Model 137 Vigilant aircraft hygrometer.

The aircraft 102 can further include flight controls 108, which in some examples can be communicatively coupled to the computer system 106 to receive flight control inputs from computer system 106. The flight controls can be configured to control aerodynamic surfaces, engine power, drag system deployment (e.g., of a streamer or parachute), or other systems to provide effective navigation or emergency recovery of the aircraft 102. Computer system 106 may also provide inputs to one or more icing remediation systems (not shown), such as heaters or vibrators configured to melt or shake off ice from critical control surfaces, such as rotor or propeller blades, or from engine air intakes. In some examples, however, aircraft 102 is not equipped with any icing remediation systems and will thus be required to rely on navigation to minimize or avoid icing. In various examples, an on-board autonomous control system can be configured to generate flight maneuver commands based on a recommended icing avoidance maneuver and to actuate flight controls 108 with the maneuver commands to execute the recommended icing avoidance maneuver, or to recommend such maneuvers to an onboard flight control computer.

In examples where aircraft 102 is crewed, aircraft 102 can further be equipped with a user interface (not shown), which can include a traditional aircraft instrumentation panel or can include or be limited to a video screen-based interface (e.g., a touch-screen interface) configured for navigating the aircraft. A user interface can additionally or alternatively be provided at a ground station 110, which can provide supervisory control of aircraft 102 or can completely control aircraft 102 in examples where aircraft 102 is uncrewed and not autonomous. Information, including navigation information and icing prediction information, can be transmitted from aircraft 102 to ground station 110 via a wireless link 112 (e.g., a radio-frequency or free-space-optical link). Navigation controls or suggestions can be provided from the ground station 110 to the aircraft 102 over the wireless link 112. In some examples, the ground station 110 may be only an air traffic control station with which the aircraft 102 is in communication and through which aircraft 102 may need to negotiate icing avoidance maneuvers that are de-conflicted with traffic patterns of other aircraft. In some examples, not illustrated, computer system 106 is not aboard aircraft 102 but is instead installed at ground station 110, such that measurements from sensors 104 are transmitted over link 112 and processed at ground station 110 to supply navigation commands or other instructions back to aircraft 102 over link 112. In still other examples, computer system 106 and its functions are distributed and/or redundantly duplicated between aircraft 102 and ground station 110.

Figure 2:
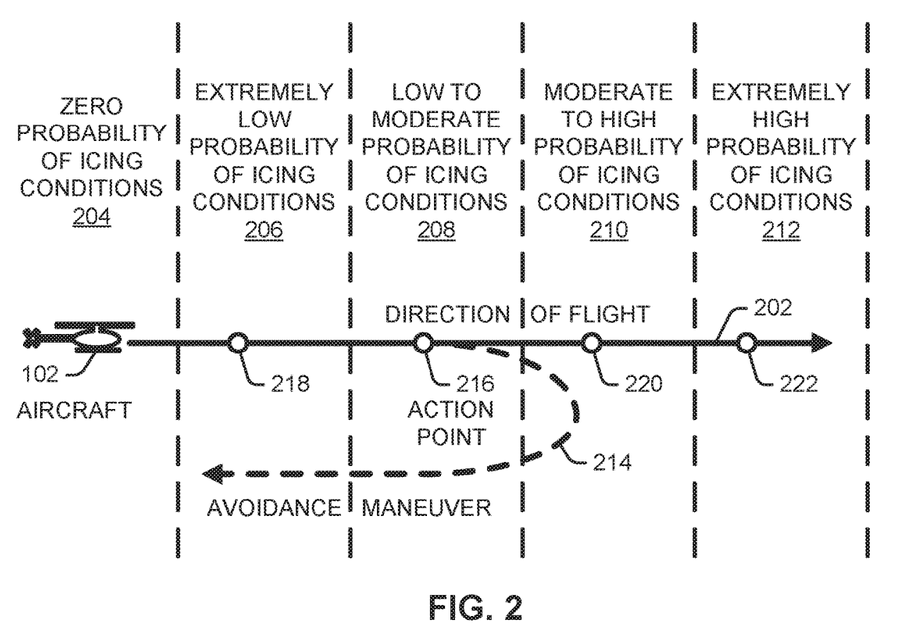
FIG. 2 is a diagram of an example flight path of an aircraft equipped with a system for icing prediction.

FIG. 2 illustrates a path of flight 202 of aircraft 102 through a series of air mass zones 204, 206, 208, 210, 212 of progressively increasing probability of icing. Although path 202 is illustrated for simplicity as being straight and horizontal, this path can take on any number of changes in altitude or heading, with any number of waypoints. Likewise, although the zones 204, 206, 208, 210, 212 are illustrated for simplicity as being arranged horizontally with respect to each other, in some examples the zones may be stacked vertically or in any other configuration. In the illustrated example, the aircraft 102 takes off in conditions of zero probability of icing 204 and will likely suffer catastrophic failure or mission endangerment if it progresses along initial flight path 202 to a zone of conditions of extremely high probability of icing 212. The danger of zone 212 may not be known or detectable at the time of takeoff or otherwise at the time of planning of route 202.

As it transitions through one or more air masses, aircraft 102 can continuously monitor and trend ambient conditions to provide an early indication of the potential for ice accumulation, e.g., on rotor blades. As examples, these ambient conditions can include outside air temperature (OAT) and dew point. Measurement of temperature can assist in defining a trend towards a freezing point. Ice forms under conditions where the temperature is conducive to the formation of ice, but aircraft 102 may fly through an air mass that is warmer than the freezing point and still accumulate ice, as where colder air above aircraft 102 permits frozen precipitation to fall into warmer air where aircraft 102 is operating. In contrast, flight in temperatures below freezing may pose only a negligible risk of icing provided there is adequate separation between the outside air temperature and the dew point. As the difference between outside air temperature and the dew point is reduced, and the outside air temperature is below or near freezing, the probability of ice accumulation increases. Dew point data collected by aircraft 102 can assist in trending a point where the ambient air reaches a saturation point where moisture is present. Thus, measurement and analytical combination of both temperature and dew point can provide a more accurate indication of icing potential than can be provided by either of these measurement s taken alone.

Computer system 106, whether, as illustrated, aboard aircraft 102 or at ground station 110, may process data inputs, including from continuously measured environmental data, with an icing prediction decision engine configured to develop an icing probability trend, and from this trend, a probability metric (e.g., in percent chance of icing) along with a time or distance to such probability metric may be reported. As the aircraft 102 travels into different weather situations, a computed percent chance of icing may change, such that at one point in time, computer system 106 may compute, and potentially report, as via a user interface, a 60 percent chance of icing, whereas at a later point in time, computer system 106 may compute an 80 percent chance of icing. As computer system 106 plots this information as the icing probability trend, based on the changing conditions, the computer system may predict, as examples, that a one hundred percent chance of entering icing conditions will develop in another 10 minutes of travel, or in another 20 miles of travel. Computer system 106 may therefore produce an alert to this effect and/or suggest a change in course to avoid icing conditions. Threshold limits dictating at what percentage probability an alarm is generated, or a maneuver is suggested or executed, may be set by operator or a developer.

If an icing probability trend derived from measured environmental data indicates a progressive increase risk of icing conditions, then icing avoidance or remediation action may be required. Aircraft 102 may therefore issue an alert to an onboard crewmember and/or a remote pilot, who may then take appropriate action, or, if aircraft 102 is autonomous, may automatically negotiate and initiate, at an action point 216, an icing avoidance maneuver 214 and/or may activate icing remediation systems, if so equipped. When remotely controlled, aircraft 102 can also be configured to automatically initiate icing avoidance maneuver 214 and/or may activate icing remediation systems after some timeout period during which no response is received from a remote operator. The avoidance maneuver 214, whether controlled by a human pilot or autonomously, may include an altitude change, a waypoint adjustment, or a return to base (RTB), and may involve any number or combination of control surface or vehicle power adjustments to effectuate the maneuver 214. If the trend indicates a constant ice threat level within adequate safety margins, then flight may be continued along the initially intended path 202. Likewise, if the trend indicates decreasing probability of icing conditions, then flight may be continued along the initially intended path 202 (a "no-issue" scenario). In addition to providing a probability value that aircraft 102 will enter icing conditions along its current flight path, the system 100 can provide a value of confidence in the probability value based on the maturity of the current data set. As actual data icing condition data is collected over time, from the aircraft 102 and/or from multiple like aircraft, the increase in confidence relative to the prediction produced by the system 100 can be realized.

Icing avoidance maneuver 214 may be initiated at an action point 216, or at an earlier or later action point 218, 220, 222. The multiple action points 218, 216, 220, 222 may be defined off-set with respect to each other along initial path 202. Action points 218, 216, 220 may be defined off-set with respect to probable point of icing 222 to accommodate an operator-defined amount of acceptable risk of icing and to provide a margin of safety or to account for pressure differences induced by rotor blades of the aircraft 102 that may cause the precipitation of moisture due to a change in vapor pressure. For example, taking action at point 222 after aircraft 102 is already in conditions of extremely high probability of icing 212 may be too late to save aircraft 102 from catastrophic icing, whereas taking action at earlier action point 216 may provide ample time to plan, negotiate, and execute an avoidance maneuver 214 such that aircraft 102 may enter elevated-probability icing conditions 210 but will not enter extremely-high-probability icing conditions 212.

In still other instances, an operator may decide, owing, for example, to the relative importance of the mission and the relative expendability of the aircraft, that a higher risk of icing is acceptable, and, in accordance with user-configurable parameters setting this level of risk, the icing prediction decision engine may instead decide to execute the icing avoidance maneuver, if any, at a later action point 220, whereas in instances calling for minimized aircraft loss tolerance and/or lesser mission criticality, the icing prediction decision engine may instead decide to execute the icing avoidance maneuver at an earlier action point 218. The placement of action points can be done by the icing prediction decision engine executed by computer system 106 and can be designable through engineering configurable parameters used to adjust or tune the icing prediction decision engine executed by computer system 106.

Figure 3:
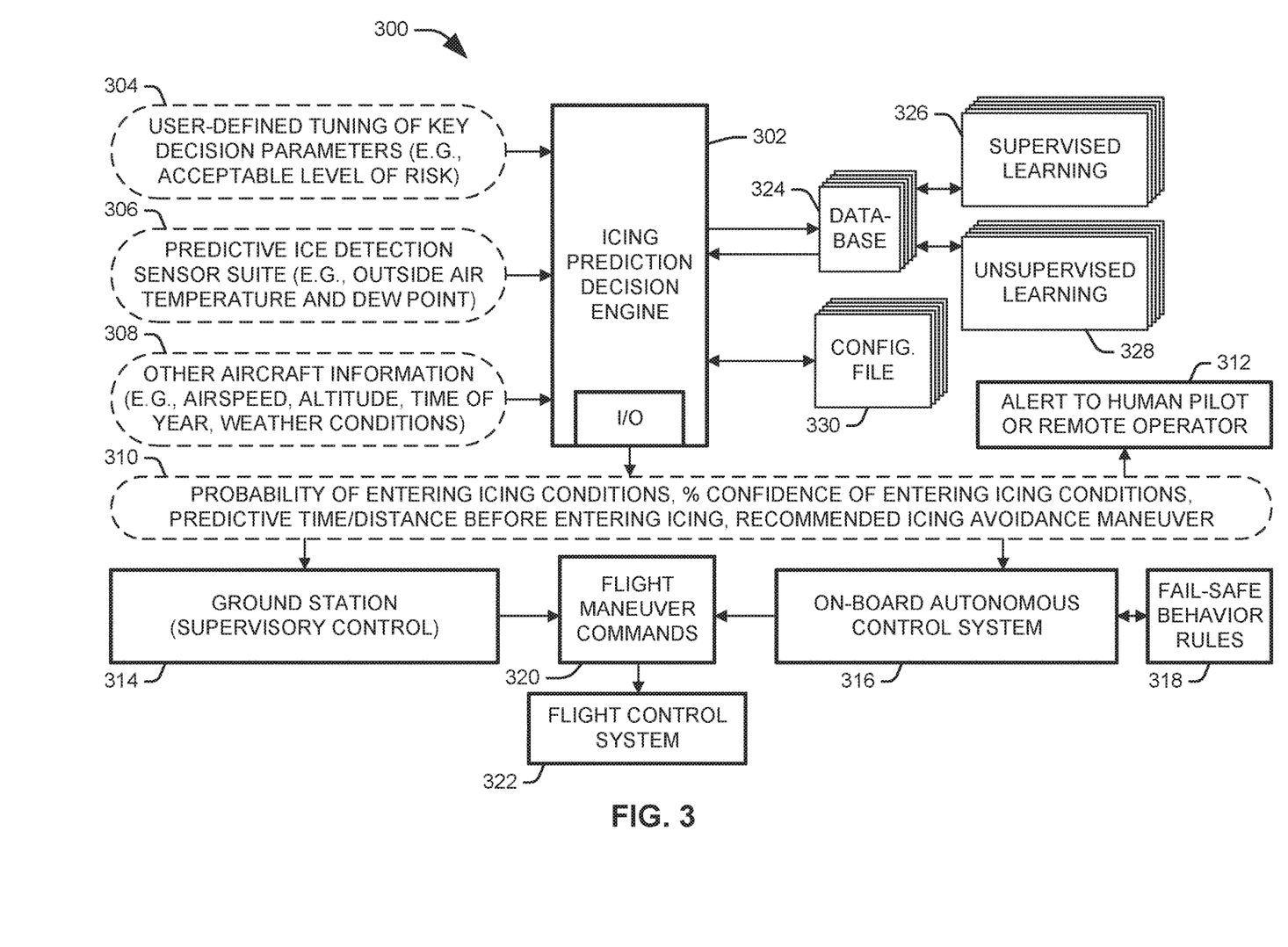
FIG. 3 is schematic diagram of an example machine-learning-based icing prediction system.

FIG. 3 illustrates an example icing prediction system 300 including an icing prediction decision engine 302. Icing prediction decision engine 302 may, for example, comprise a Bayesian artificial neural network (BNN) configured to process inputs 304, 306, 308, 324, 330 to provide outputs 310. In some examples, icing prediction decision engine 302 can be implemented in hardware as an application-specific integrated circuit (ASIC) or using a digital signal processor (DSP) or a field-programmable gate array (FPGA). In other examples, icing predication decision engine 302 may be implemented in software as machine-readable instructions stored on one or more non-transitory computer-readable media executable by one or more general-purpose computer processors, which may be included as part of a multi-function air vehicle computer or as a separate dedicated computer module the sole functions of which are to predict icing and generate alerts and/or avoidance maneuvers. In any case, icing prediction decision engine may be thought of as being comprised by computer system 106 of FIG. 1, which may be onboard, ground-based, or distributed.

Icing prediction decision engine 302 may, for example, utilize machine learning algorithms to provide a probability that an aircraft is approaching icing conditions such that one or more icing avoidance maneuvers may be taken proactively before the aircraft accumulates an intolerable amount of ice. The icing prediction decision engine 302 can, for example, be configured to calculate the probability of entering icing conditions based on acquired real-time measurement data as supplied by a predictive ice detection sensor suite 306 as compared to historical data in database 324 informed by supervised learning 326 and/or unsupervised learning 328 over a number of epochs. Icing prediction decision engine 302 then may provide outputs 310 including probability of entering airspace with icing conditions and a metric of confidence regarding the determination of the probability of entering airspace with icing conditions.

In addition to receiving as inputs and considering measured data from sensor suite 306 and user-defined tuning of key decision parameters 304, such as an acceptable level of risk of icing, icing prediction decision engine 302 can also consider other aircraft information 308 as may be available, such as current airspeed of the aircraft, current altitude of the aircraft, time of year, global positioning system (GPS) data, terrain or topographic map data, aircraft traffic data as may be reported by a control tower or home base, and current weather condition data as may be reported to the aircraft (such as fronts and air-mass changes). Icing prediction engine 302 can further consider information pertinent to the aircraft and its payload, as may be stored in configuration file 330. Configuration file 300 may store information regarding the tolerance to icing of the aircraft platform. For example, the configuration file for a small helicopter drone may quantify that the drone has a zero percent icing tolerance, effectively indicating that any ice accumulation at all will result in loss of the drone. By contrast, a configuration file for a larger aircraft may quantify a greater icing tolerance. Configuration file 330 may also store information regarding the performance capabilities of the aircraft, such as information regarding how quickly a given maneuver can be executed, in view of the flight control systems with which the aircraft is equipped, the power available to the aircraft, the weight of the aircraft, and the weight of the aircraft's payload. Whereas the tuned parameters 304 are indicative of what the user finds acceptable in terms of icing conditions, the configuration file 330 is unique to the aircraft platform. Examples of a user-defined decision parameter 304 is a stored input indicative of the level of computed probability that an icing condition will be encountered that must be reached, or the level of required confidence in an icing prediction, for an icing risk alert or icing avoidance maneuver to be triggered. Outputs of icing prediction decision engine 302 can also be stored back to database 324 to inform future decision-making, thus enlarging the "library of learning" from which icing prediction decision engine 302 may draw.

In some examples, information from user-defined parameters 304 and configuration file 330 may conflict. For example, configuration file 330 may indicate that an aircraft has complete intolerance to icing, but, in view of the importance of a mission and/or the disposability of the aircraft, user-defined parameters 304 may indicate that some risk of icing should be tolerated. Thus, in some examples, prediction engine 302 can be configured to assign precedence to the user-defined parameters 304 over data from the configuration file 330 in making determinations about acceptable levels of icing risk. In some examples, the configuration file 330 can provide a baseline, and the library of learning in database 324 can adjust the confidence as learning data matures.

A local library of learning can be stored within an onboard memory storage (e.g., associated with computer 106), continuously updated during flight, and drawn upon by aircraft 102 during flight to inform icing probability determinations. Additionally or alternatively, a centralized library of learning file can be stored at ground station 110, periodically or continuously updated by aircraft 102 or other similar aircraft either wirelessly during flight or via a wired or wireless post-flight data transfer made upon return to base, and drawn upon by aircraft 102 and/or made be made accessible to other similar aircraft to inform icing probability determinations either made by aircraft 102 or other similar aircraft. For example, the centralized library of learning can be made available to multiple aircraft for data sharing through a general network at the operator's base 110. The centralized library of learning can encompass all learning performed by all aircraft associated with the centralized library of learning, and can be continuously or periodically synchronized with one or more local libraries of learning as may be stored on these individual aircraft. In some examples, all similar aircraft operate off of the same centralized library of learning at all time. In other examples, each aircraft is provided with its own local library of learning that is only periodically updated with information from the centralized library of learning and/or itself used to update the centralized library of learning. Accordingly, the centralized library of learning can over time build up knowledge from multiple similar aircraft, which accumulated knowledge can be made available to any or all of these aircraft.

Icing prediction decision engine 302 can compute, among other outputs 310, a probability of entering icing conditions and a percent confidence in this probability determination. Based on, among other factors, the computed probability exceeding a threshold determined by user-defined decision parameters 304, such as an acceptable level of risk, decision engine 302 can take any of a variety of actions appropriate to the circumstances, aircraft configuration, and confidence level. As one example, where the aircraft is human-piloted, system 300 can be configured to issue an alert 312, e.g., via a user interface, to an onboard pilot or other crew member or a remote pilot or operator of the aircraft. This alert can take on one of a number of alert levels, e.g., from moderate alert to severe alert, and may, in some cases, be accompanied by a suggested avoidance maneuver. As one example, a generated verbal message may inform a pilot that icing is predicted and tell a pilot to pitch up or down to increase or reduce altitude to a suggested safe level altitude. As another example, detailed control instructions and/or a map of a suggested new route may be displayed on a visual display available in the flight deck of a crewed aircraft or to a remote operator.

Where the aircraft is remotely piloted from a ground station 314 (so-called "human-in-loop" control), the alert and/or suggested maneuver may lead ground-station supervisory control to enter maneuver commands or approve suggested maneuver commands 320, which may then be transmitted back to the aircraft for execution by the aircraft's flight control system 322. As another example, where the aircraft is semi-autonomous and involves functions where a remote operator need not approve of an aircraft action beforehand but retains the authority to veto the action before the execution of the action or to abort the action once it has begun (so-called "human-on-loop" control), a ground station operator may cancel or modify a maneuver prior to or during execution by the flight control system 322. As still another example, where the aircraft is fully autonomous (so-called "human-out-of-the-loop" control), an onboard autonomous control system 316, communicatively coupled to and in receipt of icing probability information 310 from the icing prediction decision engine 302, may formulate flight maneuver commands 320, as from a recommended icing avoidance maneuver 310 provided from decision engine 302, for execution by the flight control system 322. In this human-out-of-the-loop scenario, the onboard autonomous control system 316 can formulate its flight maneuver commands 320 based also on fail-safe behavior rules 318, designed, for example, to prevent attempted execution of a maneuver unsafe for the aircraft or its payload.

The icing prediction system 300 can be configured to provide different levels of action or alerts based, for example, on the confidence associated with the computed probability of the aircraft approaching icing conditions. The use of the confidence determination to decide on the level or action or alert to initiate or generate provides for a more accurate determination of icing conditions with a lower false alarm rate. For example, at a lower confidence, the system 300 can be configured to generate a weak alert 312 to a human pilot or remote operator, e.g., with a first color indicator light or display message (e.g., yellow) delivered to a user interface and/or with a lower-amplitude or lower-frequency audible alarm delivered by loudspeaker or headset, whereas at a higher confidence, the system 300 can be configured to generate a stronger alert 312 with a second color indicator light or display message (e.g., red) or a higher-amplitude or higher-frequency audible alarm. In other examples, at a lower confidence, the system 300 can be configured to suggest or execute a less drastic avoidance maneuver (e.g., one with a lesser course deviation) that still attempts to avoid icing conditions, whereas at a higher confidence the system 300 can be configured to suggest or execute a more drastic avoidance maneuver. An example of a less-drastic maneuver might be a pitch-up (climb) or pitch-down (dive) or a bank of less than 180 degrees, whereas an example of a more-drastic maneuver might be a 180-degree turn-around or a return to base. In some examples, system 300 can also be designed with persistence logic, also referred to as de-bounce logic, (not shown) to increase confidence of a valid determination that the aircraft is approaching icing conditions.

Figure 4:
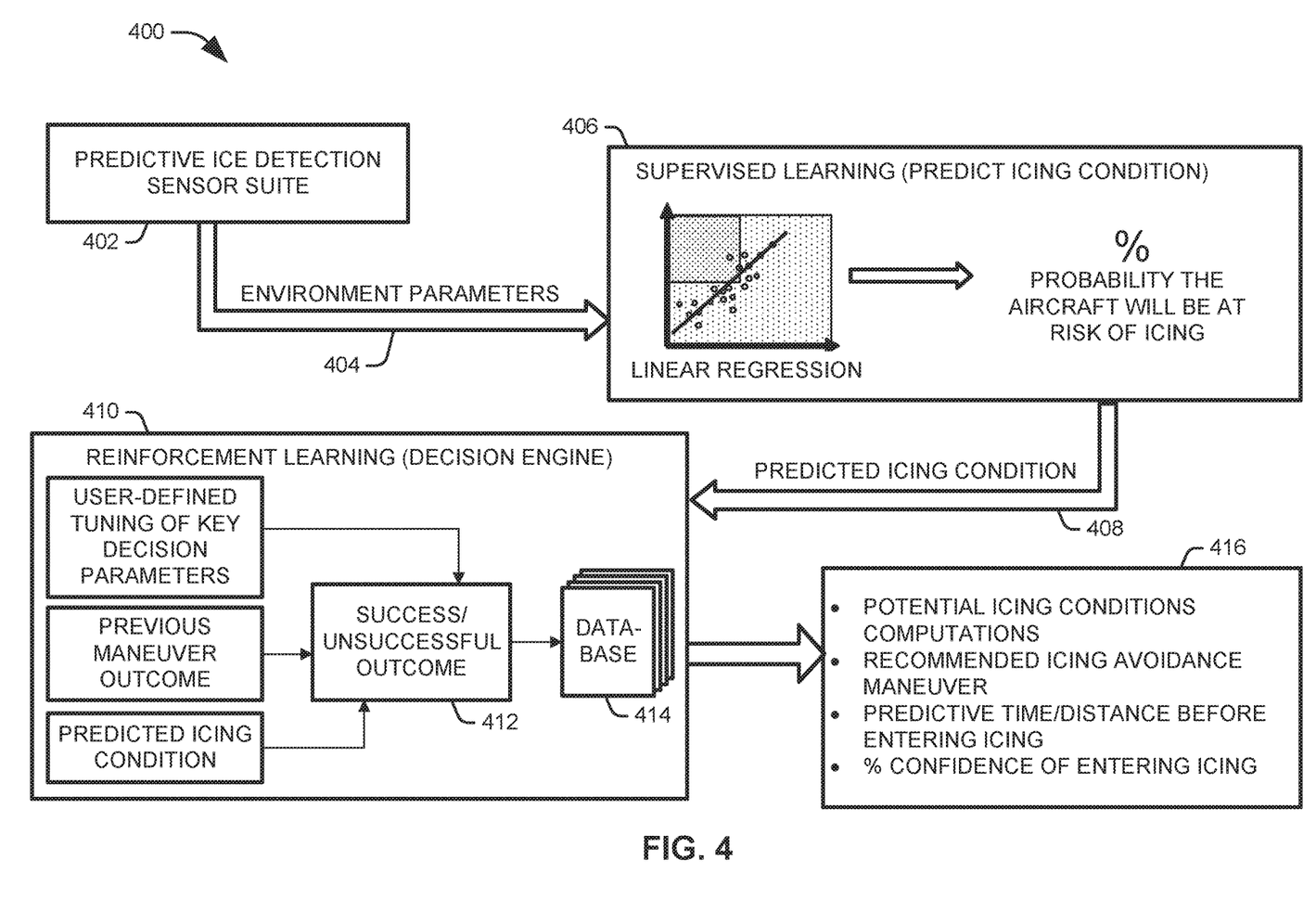
FIG. 4 is a diagram illustrating an example functioning of a machine-learning-based icing prediction system.

FIG. 4 illustrates example functioning 400 of an icing prediction system including icing prediction decision engine 410 such as engine 302 of FIG. 3 and its associated supervised learning and unsupervised learning logic 326, 328. Predictive ice detection sensor suite 402, which can correspond to suite 306 of FIG. 3, can continuously measure environment parameters 404 and supply them to a supervised learning engine 406 configured to predict an icing condition. The sensor suite 402 can include, for example, outside air temperature and dew point sensors, and the environment parameters 404 can include temperature and dew point data. By "continuously," it is meant that the data is sampled with sufficient frequency to ensure useful icing-predictive functioning of the system. Depending on the circumstances, measurements can be repeatedly made by sensor suite 402 with a frequency on the order of milliseconds, seconds, tens of seconds, or minutes, either periodically or at randomized intervals.

The supervised learning engine 406, which can correspond to supervised learning 326 in FIG. 3, processes acquired environment parameters 404, e.g., air mass temperature and dew point data, using, for example, linear regression (as illustrated), multi-layer regression (not shown), or a regression model that applies a set of weights to functions of extracted categorical or continuous features, such as linear functions, to provide a continuous result. Supervised learning 326 computes a metric indicating the probability that the aircraft will be a risk of icing (e.g., expressed as a percentage or log odds). Supervised learning 406 is "supervised" in that the environmental data is labeled, e.g., it is known to the system that measured dew point data represents environmental dew point and temperature data represents ambient air temperature. Algorithms for supervised learning include logistic regression, naive Bayes, support vector machines, artificial neural networks, and random forests. In some examples, the axes of the regression plot can be temperature and dew point. In other examples, different measured environmental parameters can be used as alternative or additional axes of the regression plot. For example, a regression plot may also include altitude and/or time as other axes. In any case, the supervised learning engine uses regression analysis to develop a trend based on measured data collected from the current flight, and uses the trend to generate a probability metric indicative of how likely it is that the aircraft will be at risk of icing. In some examples of icing prediction systems, this probability can be thresholded and used to generate an alarm or initiate an avoidance maneuver planning routine. Such examples may omit any reinforcement learning engine.

In other examples, results of predicted icing condition computations 408 may then be provided to a reinforcement learning (RL) engine (decision engine) 410, which can correspond to unsupervised learning 328 in in conjunction with decision engine 302 of FIG. 3. RL engine 410 is configured to account for user-defined tuning of key decision parameters (corresponding, e.g., to parameters 304 of FIG. 3), information about the outcome of one or more previous maneuvers (indicative, e.g., of whether a maneuver successfully avoided icing, or whether the absence of a course-deviating maneuver successfully avoided icing), and the currently predicted icing condition 408 to determine 412 whether a planned avoidance maneuver or a decision not to make an avoidance maneuver is likely to have a successful outcome or not. Maneuvers with successful outcomes may be written back to database 414, which can correspond to database 324 of FIG. 3, providing learned information that can be used for future machine-learning data-processing and decision-making by decision engine 410. Reinforcement learning engine 410 may provide, as outputs 416 (corresponding, e.g., to outputs 310 of FIG. 3), potential icing conditions computations and/or their results, a recommended icing avoidance maneuver, a predictive time and/or distance before entering icing, and a percent confidence of entering icing. In some instances, it may become evident, through continuous iterative functioning of the icing prediction system, that a planned and executed icing avoidance maneuver is insufficient to avoid icing. A new or more drastic maneuver may then be planned, suggested, and/or executed, but also, the lack of success of the initially planned maneuver will be indicated in database 414 (or 324 of FIG. 3) and will thus be available to inform future avoidance maneuver decisions.

Figure 5:
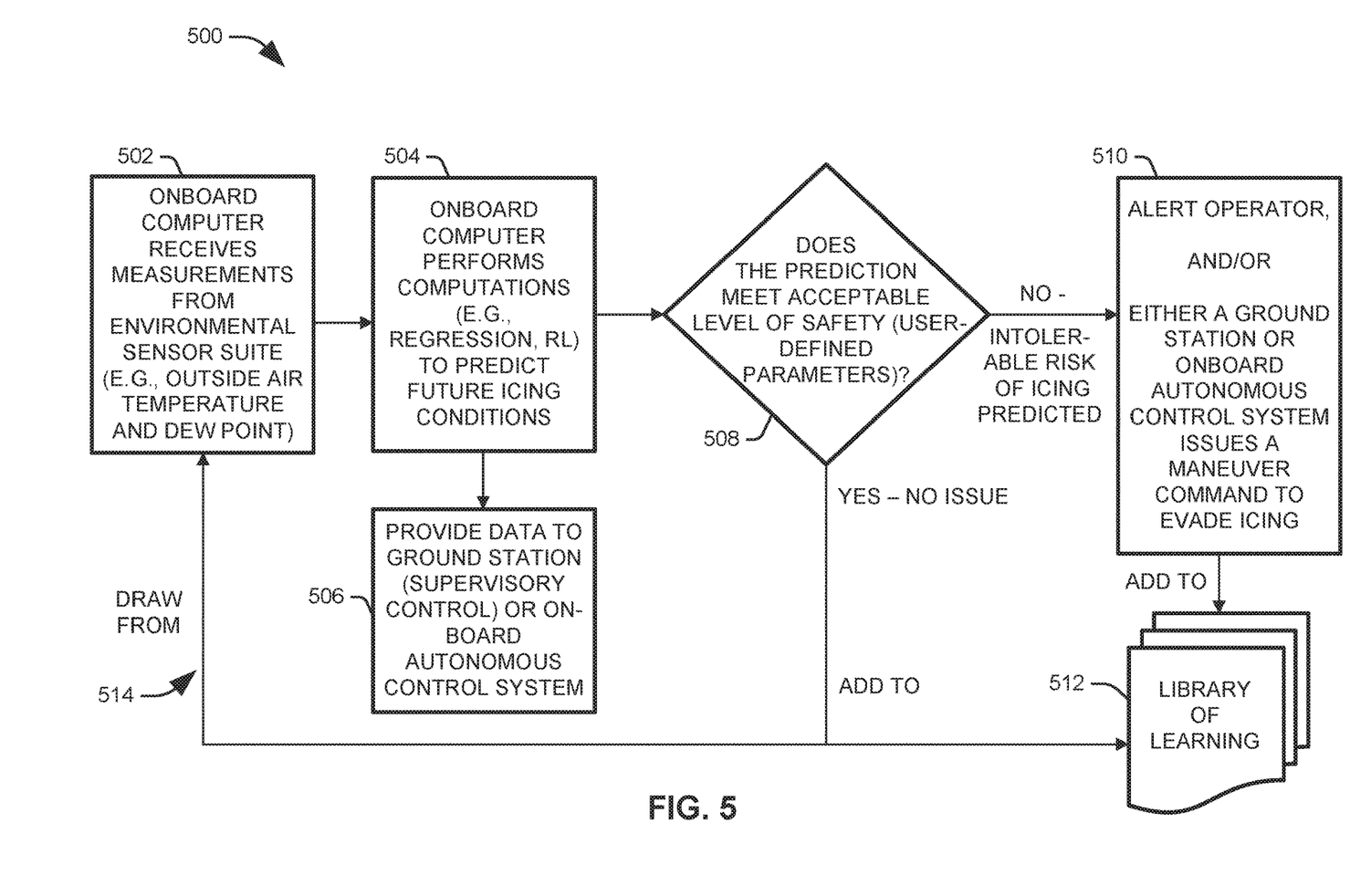
FIG. 5 is a flow diagram illustrating an example method of machine-learning-based icing prediction and avoidance.

FIG. 5 illustrates an example icing prediction process. An onboard computer (e.g., computer system 106 of FIG. 1) of an aircraft interrogates an onboard ice detection sensor suite (e.g., sensors 104 of FIG. 1, sensor suite 306 of FIG. 3, or sensor suite 402 of FIG. 4) to derive environmental data such as outside air temperature and dew point (corresponding to environment parameters 404 of FIG. 4). The onboard computer system then performs computations 504 to predict future icing conditions. Such computations can be performed using, for example, supervised learning, unsupervised learning, or a combination of both. Computed predicted future icing conditions, among other data, can be provided 506 to a ground station (e.g., ground station 110 in FIG. 1, e.g., via wireless link 112) and/or to an onboard autonomous control system.

Based on the prediction not comporting with an acceptable level of safety 508, as may be defined by user-defined parameters (e.g., parameters 304 of FIG. 3), an action may be taken 510, which action may include delivering an alert to a human operator (if any) about an impending danger of icing, and/or may include issuing of an icing-evasion maneuver command from either a ground station or an onboard autonomous system. The prediction and suggested maneuver can be added 512 to a library of learning, which can be stored, for example, as database 324 in FIG. 3 or 414 in FIG. 4. Based on the prediction comporting with an acceptable level of safety 508, it is thus determined that no action need be taken to avoid icing, and the prediction may be added to the library of learning 512, which effectively provides a machine learning database that can be used to improve icing prediction determinations.

As indicated by feedback arrow 514, the onboard computer may also interrogate the library of learning 512. Ambient conditions may also be stored in the library of learning 512. As the icing prediction system acquires learned experience, the data from the library of learning 512 can be used to assist in making a determination as to whether it is safe to continue along a current flight path or not. For example, an aircraft may take off and as it climbs, the aircraft may measure decreasing outside air temperature and dew point. This may be because the aircraft is entering a marine layer or entering a cloud deck. However, based on historical data from the library of learning 512, the aircraft's onboard computer may determine that, based on the similarity of the present conditions to those encountered in the past, the estimated amount of time spent in the marine layer or cloud deck will result in a drop in temperature and an increase in moisture content (as determined from dew point data) not likely to cause icing within the amount of time spent in the marine layer or cloud deck. In such a case, the computer may decide, with an acceptable degree of confidence, that the marine layer or cloud deck may be safely traversed without risk of encountering icing conditions. Accordingly, in such case, there would be no need to generate an alarm or propose an avoidance maneuver ("no-issue").

The systems and methods described herein thus combine collected environmental data with trend plots to calculate the probability that the air vehicle is approaching icing conditions such that preemptive action can be taken in advance. The systems and methods may either issue an autonomous maneuver action (for autonomous uncrewed aircraft), or provide alerts to a ground station operator for remotely piloted unmanned aircraft. The systems and methods can also be used in crewed aircraft by providing both impending icing risk alerts and navigation prompting to a pilot as recommendations to avoid icing conditions. Configurable action points can be used to control the amount of risk that the operator is willing to take and the degree of confidence required to complete the mission. The systems and methods can make use of machine learning to increase the confidence level of predictive icing conditions, based on supervised and unsupervised learning from many epochs considering similar atmospheric conditions, weather patterns, and calendar time.

The machine-learning-based icing prediction systems and methods described herein can detect icing conditions at standoff distances greater than previously possible. For example, icing conditions can be detected using these systems and methods at a minimum of a half mile. The machine-learning-based icing prediction systems and methods described herein can detect icing conditions with aircraft power requirements much lower than may be required by, for example, systems using weather radar to detect icing conditions. For example, these systems and methods can operate by drawing power from a 28 volt DC power system and can operate with less than 1 kilowatt of power. The machine-learning-based icing prediction systems and methods described herein can be implemented with weight requirements lower than previously achievable. For example, these systems and methods can be implemented with a weight penalty of less than 10 pounds imposed upon an aircraft. The machine-learning-based icing prediction systems and methods described herein can also be implemented at lower costs than previously achievable.

The machine-learning-based icing prediction systems and methods described herein can predict ice conditions at a standoff distance much earlier than previously possible, and can use machine learning to increase the confidence of the predictions, with reduced weight and power draw requirements as compared to systems or methods requiring an onboard weather radar. Accordingly, the systems and methods described herein are especially useful for icing prediction and avoidance for smaller, uncrewed aircraft, including smaller helicopters, quadcopters, autonomous aerial drones, and remotely navigated aircraft, which may not be equipped with onboard weather radar or icing remediation systems and for which detection of and alert to icing after the aircraft has already entered potential icing conditions can be too late to avoid loss of aircraft. The systems and methods can provide reduced operating environment stress on an onboard or remote human pilot or an autonomous navigation system, and can be implemented at low cost.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system for aircraft icing prediction comprising:
   an aircraft-mounted environmental sensor suite configured to measure at least two different kinds of environmental parameters corresponding to conditions external to an aircraft as the aircraft travels along a flight path;
   data acquisition circuitry communicatively coupled to the environmental sensor suite and configured to acquire and deliver real-time environmental data from the environmental sensor suite, wherein a database stores a library of learning comprising information about the success or failure of previous icing avoidance maneuvers, and wherein a reinforcement learning engine is configured to issue no icing risk alert and recommended no icing avoidance maneuver based on a determination of a tolerable risk of icing made based on the information in the library of learning; and an onboard computer system, communicatively coupled to the data acquisition circuitry to receive the environmental data, the computer system comprising a supervised learning engine and the reinforcement learning engine configured to process the environmental data and user-defined parameters to compute a probability that the aircraft will experience icing along the flight path, and to generate an icing risk alert and/or a recommended icing avoidance maneuver based on the computed probability of icing.

2. The system of claim 1, wherein the environmental sensor suite comprises an outside air temperature sensor and a dew point sensor, and wherein the real-time environmental data includes measurements of outside air temperature and dew point.

3. The system of claim 1, further comprising a user interface communicatively coupled to the computer system and configured to convey the generated icing risk alert to an onboard crewmember or a remote operator.

4. The system of claim 3, wherein the reinforcement learning engine is further configured to generate a confidence metric indicative of confidence in the predicted icing condition, and wherein the user interface is further configured to display the generated confidence metric.

5. The system of claim 1, wherein the computer system is further configured to generate a recommended icing avoidance maneuver based on the real-time environmental data and based on at least one of current airspeed of the aircraft, current altitude of the aircraft, time of year, global positioning system (GPS) data, terrain or topographic map data, aircraft traffic data, and/or current weather condition data.

6. The system of claim 1, further comprising an on-board autonomous control system configured to generate flight maneuver commands based on the recommended icing avoidance maneuver and to actuate flight controls with the maneuver commands to execute the recommended icing avoidance maneuver or to recommend maneuvers to an onboard flight control computer.

7. A method, executed on an aircraft icing prediction computer system, of predicting icing of an aircraft, the method comprising:
performing a regression analysis of real-time environmental data collected during a flight of the aircraft using a supervised learning algorithm to predict a risk of icing;
determining a metric of confidence in the predicted risk of icing using a reinforcement learning algorithm and based on the regression analysis; and
based on determining that the predicted risk of icing does not meet an acceptable level of safety based on user-defined parameters, at least one of:
generating an icing risk alert to an onboard crewmember or a remote operator; and/or
recommending an icing avoidance maneuver; or
based on determining that the predicted risk of icing meets the acceptable level of safety, not issuing the icing risk alert, not recommending the icing avoidance maneuver, and adding the environmental data and the predicted risk of icing to a library of learning stored in a database.

8. The method of claim 7, wherein the real-time environmental data includes measurements of outside air temperature and dew point.

9. The method of claim 7, further comprising issuing the icing risk alert and the confidence metric via a user interface.

10. The method of claim 7, further comprising issuing the icing risk alert and a predictive time and/or distance before entering icing.

11. The method of claim 7, wherein the recommended icing avoidance maneuver is based on the real-time environmental data and based on at least one of current airspeed of the aircraft, current altitude of the aircraft, time of year, global positioning system (GPS) data, terrain or topographic map data, and/or current weather condition data.

12. The method of claim 11, wherein the not issuing the icing risk alert and the not recommending the icing avoidance maneuver is based on information in the library of learning.

13. The method of claim 11, wherein the recommended icing avoidance maneuver is based on configuration data stored in a configuration file that includes tolerance to icing conditions of the aircraft.

14. An aircraft comprising:
an airframe;
an outside air temperature sensor mounted to the airframe and configured to collect measurements of outside air temperature;
a dew point sensor mounted to the airframe and configured to collect measurements of dew point; and
computing circuitry configured to perform supervised learning comprising regression analysis of the collected outside air temperature and dew point measurements to determine a risk of icing of the aircraft, and wherein the computing circuitry is configured to perform unsupervised learning to provide a metric of confidence in the determined risk of entering icing.

15. The aircraft of claim 14, wherein the computing circuitry is further configured to perform unsupervised learning to provide a predictive time and/or distance before entering icing.

16. The aircraft of claim 14, wherein the computing circuitry is further configured to generate, based on the determined risk of icing and on a user-defined acceptable level of risk, one or both of:
an icing risk alert to an onboard crewmember or remote operator; and/or
a recommended icing avoidance maneuver to an on-board autonomous control system.

17. The aircraft of claim 14, wherein the computing circuitry is further configured to perform unsupervised learning and to not issue an icing risk alert or a recommended icing avoidance maneuver based on the determined risk of icing and on historical flight data in a library of learning stored in a database.

* * * * *